Dec. 10, 1957 P. R. MARSHALL 2,815,877
WHEEL-MOUNTING TOOL
Filed Dec. 5, 1955
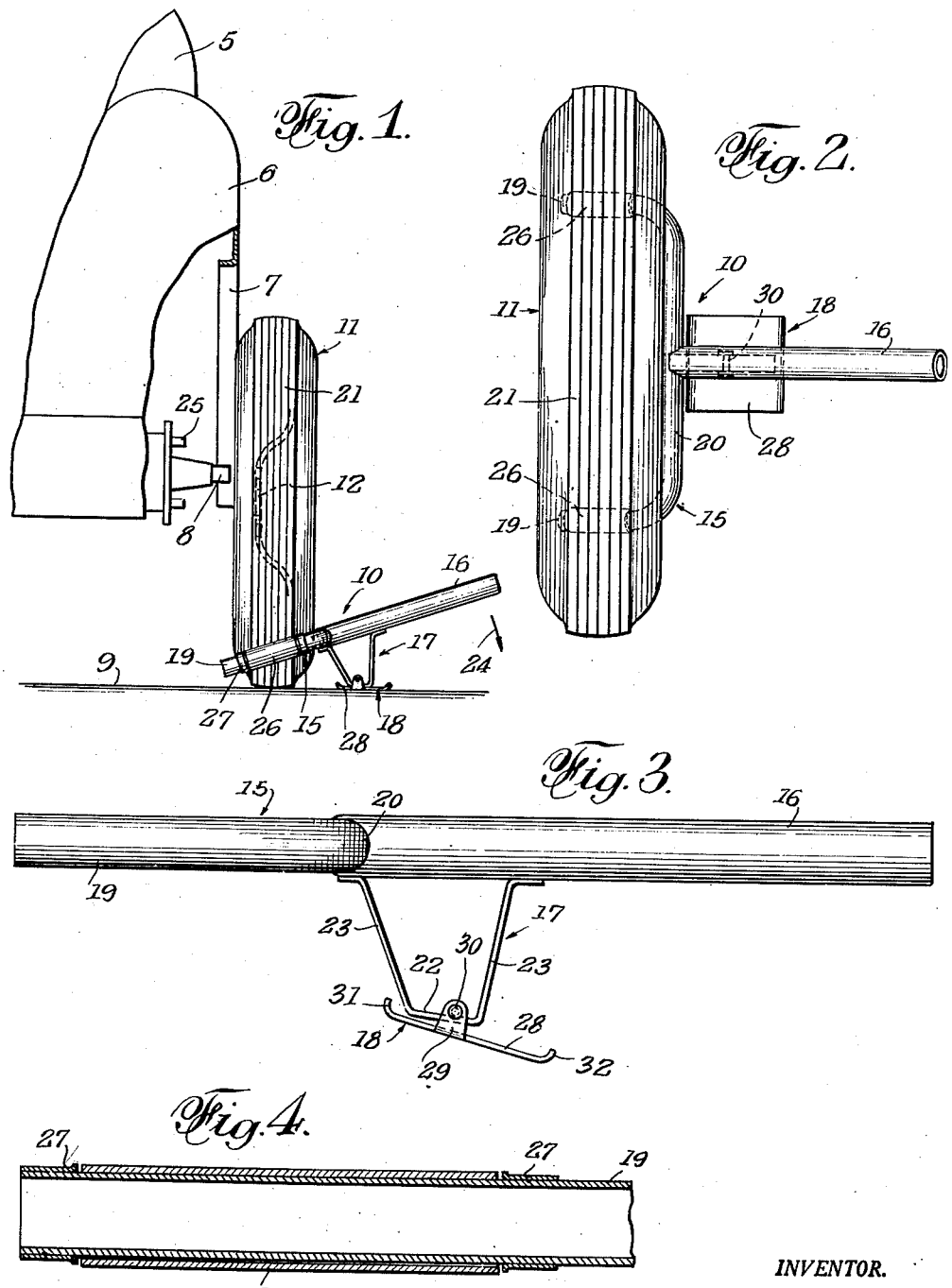
INVENTOR.
PORT RICO MARSHALL
BY C. G. Stratton
ATTORNEY

2,815,877

WHEEL-MOUNTING TOOL

Port Rico Marshall, Los Angeles, Calif.

Application December 5, 1955, Serial No. 551,026

8 Claims. (Cl. 214—332)

This invention relates to a tool facilitating mounting of a wheel on an axle; the same being particularly applicable to the wheels of automotive vehicles.

An object of the present invention is to provide a simple and effective tool to aid raising of a wheel from the ground and so aligning the same with an axle as to render mounting said wheel relatively easy and effortless.

Another object of the invention is to provide a tool of the character indicated that is adapted for use on soft and sandy road surfaces or shoulders, as well as paved surfaces.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes, one embodiment of the present invention, which is given by way of illustration or example only.

In the drawing, like reference characters designate similar parts in the several views.

Fig. 1 is an edge view of the tool, as engaged with a wheel, and preparatory to mounting the latter on an axle.

Fig. 2 is an enlarged top plan view of the tool and wheel with which engaged.

Fig. 3 is a further enlarged edge view of the tool before the same is placed on a support surface.

Fig. 4 is a still further enlarged and fragmentary longitudinal sectional view of a portion of said tool.

Fig. 1 shows a typical automobile 5 that has a fender 6 in which is provided an opening 7, and an axle 8. The latter is shown as raised above the ground 9 as would be the case when the same is jacked up to hold a wheel on said axle clear of the ground. The present tool 10 is devised for so engaging a wheel 11 as to raise the same from the ground and align the central hole 12 in the disc or hub of said wheel so that mounting the wheel on said axle 8 is rendered easy.

The tool 10 that is illustrated comprises a bifurcation 15, a handle 16 from which said bifurcation extends, a foot 17 on which the tool is supported, and a base 18 carried by the foot.

The bifurcation 15 is shown as comprising a pair of transversely spaced parallel arms 19 that are connected by a cross member 20. The U-shaped part thus formed is adapted to be presented to a wheel so that said arms 19 engaged spaced points of the tread of the tire 21 of the wheel, and the member 20 has a sidewise engagement with said tire. As seen from Figs. 1 and 2, the member 20 serves to limit the position of the tool with respect to the wheel.

The handle 16 simply comprises an extension from the middle of member 20 and in general parallelism with the arms 19.

The forked tool thus provided has a foot 17 affixed to the handle adjacent to where said handle joins the bifurcation. Said foot is shown as comprising a strap member having a lower foot part 22 that is spaced from the handle and connected thereto by brace parts 23. Being thus positioned, said foot constitutes a support that is adapted to engage the ground and serve as a point around which the tool is adapted to be rocked or partly rotated, as suggested by the arrow 24.

As seen in Fig. 1, after a wheel has been placed on the ground in front of the axle on which it is to be mounted, the tool 10 is slid in a forward direction so that the arms 19 engage on either side of the part of the tread that rests on the ground. Now, by holding the upper part of the tire with one hand, the other hand is used for depressing the end of handle 16 and, thereby, raising the wheel from the ground until the hole 12 aligns with axle 8 and can be slipped over the same.

Since it is frequently necessary to partly rotate the wheel while so raised, in order to align the bolts 25 with holes therefor in the wheel disc or hub, the arms are preferably provided with rotational sleeves 26, as shown in Figs. 1, 2 and 4, the same being retained against endwise displacement by collars 27 and engaged by the tread. Since said sleeves may readily roll, the wheel may be easily rotated by the hand that holds the same to facilitate mounting with respect to bolts 25.

The above tool is effective when used on paved or other hard surfaces. On soft or muddy surfaces, the foot 17 may so dig itself into the ground as to reduce the degree of rock or pivot of the tool. The base 18 may be provided to prevent this and essentially comprises a plate 28 that provides a large non-sinkable base on which the foot 17 may pivot, as described.

In this instance, the plate 28 is provided with ears 29 across which extends a pin 30, which has hanging connection with the foot part 22 of the foot. By placing said ears and pin nearer the front edge 31 of the plate than the rear edge 32, the plate normally assumes a tilted position, as in Fig. 3. Now, when the tool is moved into wheel-engaging position, the plate 28 easily slides even over soft and muddy surfaces to a proper position relative to the wheel.

It will be noted that plate edges 31 and 32 are turned up to insure that said plate slides easily without digging into the surface on which it is being slid. It will also be noted that the plate 28 has sliding engagement with said foot part 22. Thus, most back and forth movements of the tool may be made with respect to the base.

While the foregoing has illustrated and described what is now contemplated to be the best mode of carrying out my invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described my invention, what I claim and desire to secure by Letters Patent is:

1. A wheel-mounting tool comprising a bifurcated tire-engaging part, a handle extending from said part and generally aligned therewith, a foot on which the tool is adapted to be supported and rocked by means of its handle to raise a tire engaged with said part, said foot being disposed adjacent the junction of the handle and the bifurcated part and provided with a part spaced away from the aligned handle and bifurcated part, and a base loosely and pivotally and slidably suspended from said foot part and relative to which the tool is adapted to be rocked.

2. A wheel-mounting tool comprising a bifurcated tire-engaging part, an aligned handle extending from said part, a foot disposed adjacent the junction of said handle and said bifurcated part, said foot comprising a truncated V-shaped strap provided with a foot part spaced away from the aligned handle and bifurcated part, and a base loosely and pivotally and slidingly suspended from said foot.

3. A wheel-mounting tool according to claim 2: a pair of ears on each side of said base, said ears being mounted to straddle said strap, and a pivot pin extending between said ears and in pivotal and sliding engagement with the mentioned foot part.

4. A wheel-mounting tool according to claim 3: said pivot pin being spaced above the base a distance equal to at least twice the thickness of said strap.

5. A wheel-mounting tool comprising a bifurcated tire-engaging part, a handle extending from said part, a foot on which the tool is adapted to be supported and rocked by means of its handle to, thereby, raise a tire engaged with said part, a pivotal base carried by the foot and relative to which the tool is adapted to be rocked, said base being loosely slidable on the foot by means of a pivot pin having sliding engagement with the foot.

6. A wheel-mounting tool comprising a bifurcated tire-engaging part, a handle extending from said part, a foot on which the tool is adapted to be supported and rocked by means of its handle to, thereby, raise a tire engaged with said part, a pivotal base carried by the foot and relative to which the tool is adapted to be rocked, said base being loosely slidable on the foot, said pivotal base being weighted to tilt in a direction to hold up the end thereof on the side toward the bifurcated part.

7. In a wheel-mounting tool having an aligned handle and a tire-engaging bifurcation, a member extending from the handle adjacent to the bifurcation and provided with a foot part spaced away from the handle and of lesser longitudinal extent than the handle, and a base loosely, slidingly and pivotally connected to said foot part and, when placed on the ground, constituting a support relative to which the aligned handle and bifurcation are adapted to both pivot and slide.

8. In a wheel-mounting tool according to claim 7, the base comprising a plate and a cross pin carried thereby in spaced relation greater than the thickness of the foot part, said pin being disposed in base-suspending engagement with the foot part, said pin being located nearer the edge of the plate that is directed toward the bifurcation whereby the opposite edge of the plate is gravitationally overweighted to raise the first-mentioned edge and the base plate normally assumes an angled position relative to the handle.

References Cited in the file of this patent

UNITED STATES PATENTS

| | | |
|---|---|---|
| 1,516,329 | Busby | Nov. 18, 1924 |
| 2,345,458 | Caron | Mar. 28, 1944 |
| 2,483,908 | Jackson | Oct. 4, 1949 |
| 2,691,454 | Demlo | Oct. 12, 1954 |

FOREIGN PATENTS

| | | |
|---|---|---|
| 320,796 | Great Britain | Oct. 24, 1929 |